US010977528B1

(12) United States Patent
Tong

(10) Patent No.: US 10,977,528 B1
(45) Date of Patent: Apr. 13, 2021

(54) DETECTING SIMILARITY BETWEEN IMAGES

(71) Applicant: Amazon Technologies, Inc., Seattle, WA (US)

(72) Inventor: Dylan Tong, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 16/452,093

(22) Filed: Jun. 25, 2019

(51) Int. Cl.
*G06K 9/66* (2006.01)
*G06K 9/62* (2006.01)

(52) U.S. Cl.
CPC .............. *G06K 9/66* (2013.01); *G06K 9/6215* (2013.01)

(58) Field of Classification Search
CPC ................................ G06K 9/66; G06K 9/6215
See application file for complete search history.

(56) References Cited

U.S. PATENT DOCUMENTS

2016/0189003 A1* 6/2016 Liu ...................... G06K 9/6267
382/155

2019/0220746 A1* 7/2019 Liu ............................ G06N 3/08
2019/0258719 A1* 8/2019 Baker ...................... G06F 40/53

OTHER PUBLICATIONS

Gatys, Leon A. et al. "A Neural Algorithm of Artistic Style," Sep. 2, 2015, arXiv:1508.06576v2, 16 pages.
Jing, Yongcheng, et al.; "Neural Style Transfer: A Review," Oct. 30, 2018, arXiv:1705.04058v7, 25 pages.
Tong, Dylan et al.; "Advance Analytics using Deep Learning with PyTorch and Sagemaker," AWS re:Invent 2018, https://github.com/dylan-tong-aws downloaded on Jul. 29, 2019, 44 pages.

* cited by examiner

*Primary Examiner* — Christopher M Brandt
(74) *Attorney, Agent, or Firm* — Nicholson De Vos Webster & Elliott, LLP

(57) ABSTRACT

Techniques for determining image similar are described. For example, a computer-implemented method comprising: receiving a request to determine similarity between a first image and at least one other image; determining similarity between the first image and at least one other image based upon one or more Gram matrix-based style values and one or more vector distance calculation-based content values as determined from one or more outputs of layers of a convolutional neural network; and providing an indication of the similarity of between the first image and the at least one other image is described.

20 Claims, 17 Drawing Sheets

| IMAGE ID 1101 | LAYER 1103 | TYPE 1105 | MEASURE 1107 |
| --- | --- | --- | --- |
| IMG2 | 1 | STYLE | 0.23 |
| IMG2 | 29 | STYLE | 0.45 |
| IMG2 | 1 | CONTENT | 0.23 |
| IMG2 | 29 | CONTENT | 0.11 |

*FIG. 11*

DETECTING SIMILARITY BETWEEN IMAGES

BACKGROUND

Common techniques of determining image similarity often involve using a deep convolutional neural network (CNN) model that provides high accuracy on feature extraction (such as image classification including, but not limited to using ResNet or NASNet). Models are often pre-trained on a large generic image database like ImageNet. Image similarity scoring is achieved by augmenting the model and applying additional inference and training algorithms.

For example, one approach is to use a generically pre-trained model and applying kNN on the vector outputs of the model. In essence, the model transforms an image into a feature representation of the image and measures its similarity by calculating the distance between vectors (for example, cosine similarity, Manhattan distance, etc.). This may perform poorly on a diverse data set.

Another approach is to fine tune a model using a Siamese network or triplet loss. A deep CNN that has been trained on a generic image dataset learns features that can be applied to specific domains. Fine tuning leverages these pre-trained models as a baseline, and further improves the effectiveness of the model by tuning the weights of the model so that it performs better on a specific domain data set. A Siamese Network trains a model by taking two images and teaching the network to learn whether the images are the same or not. As a side-effect, the model learns a vector space that describes the similarity between the models in the data set. This requires the additional labor of training the model.

BRIEF DESCRIPTION OF DRAWINGS

Various embodiments in accordance with the present disclosure will be described with reference to the drawings, in which:

FIG. 11 illustrates an example of an index schema for images.

DETAILED DESCRIPTION

Figure 1:
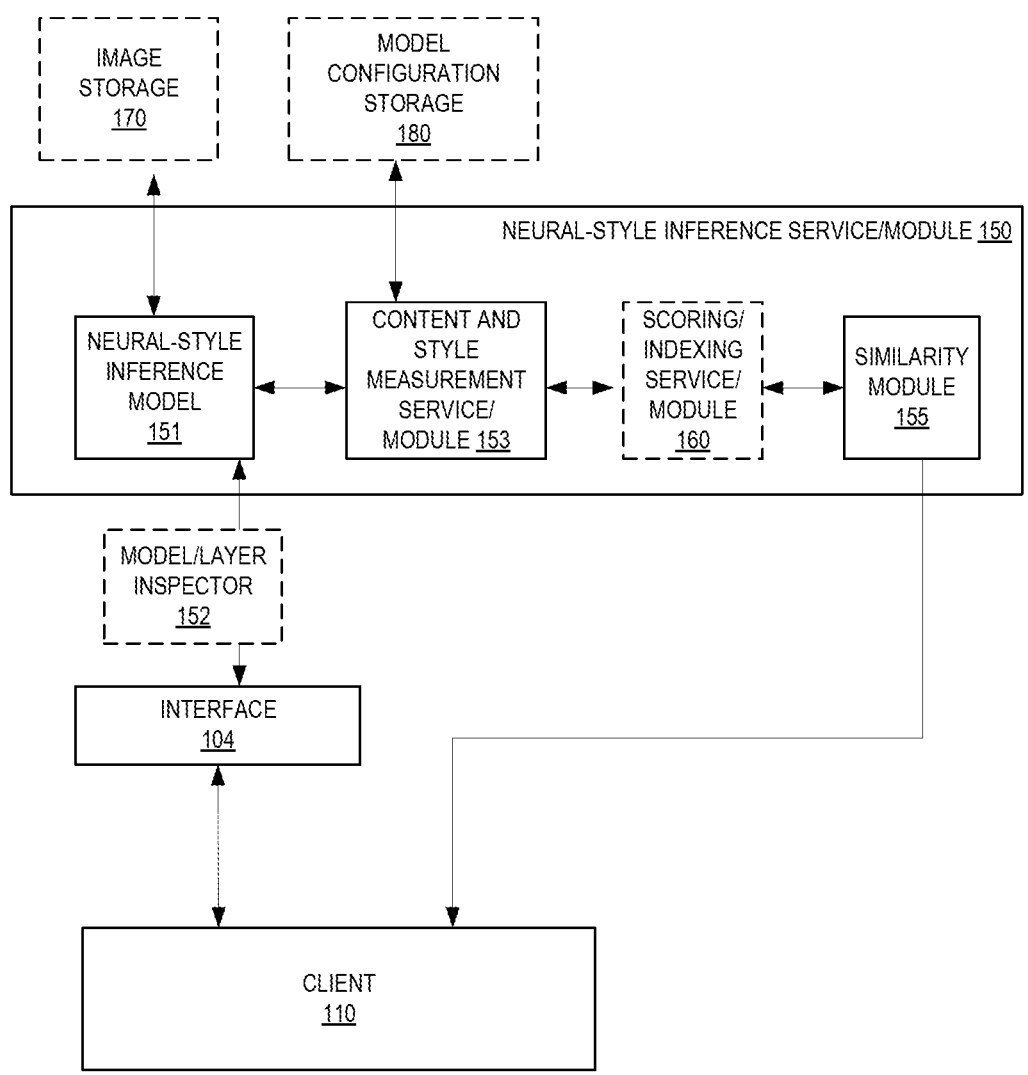
FIG. 1 illustrates a system for determining similarity between two or more images.

The present disclosure relates to methods, apparatus, systems, and non-transitory computer-readable storage media for determining similarity between images. According to some embodiments, a neural-style inference model is used to determine values for "content" and "style" for an image using outputs of one or more layers of the neural-style inference model.

Embodiments detailed herein utilize a pre-trained deep learning model, such as ResNet, and measures "style" by calculating Gram matrices on one or more activation layers of the model and "content" using vector distance calculations (such as L1 or L2) on one or more activation layers of the model. The "style" and/or "content" is then used to compare similarity between images. This has the benefit of working without labels and should perform and generalize better than common methods like using kNN on the image vectors produced by running inference on a model like ResNet.

This is an improvement over previous approaches as there is no required additional time and effort of fine tuning a model. Rather, a supervised learning process entailing the acquisition and preparation of a training set and training is performed. This increases performance especially on a diverse set of images.

Image similarity inference involves the ability to take two or more images as input into a model and obtain similarity measures between the images. Applications of this capability include: 1) visual search (the ability to provide an image to a search engine, and have it return other images that are visually similar. This has the benefit of avoiding the labor of creating metadata to describe images. It also enables searching on visual attributes that are not easily described in words); 2) advanced analytics (information about the visual similarity between images can be used to strengthen traditional business analytics. For instance, a retailer needs to make a decision around what products to retire. Sales data from the CRM and order management system can certainly help facilitate this decision. However, if one also had a metric that measures the similarity between products, this is a data point that can improve decisions.); and 3) AI enhanced user experience (more creative applications of visual search capabilities can enhance digital experiences such as enabling a "shop-by-style" experience for an ecommerce site. Imagine browsing a digital product catalog by style in a way similar to what you might do in-store—perusing products by your fashion preferences.).

Embodiments herein may also enhance personalization such as the effectiveness of recommendations. Product recommendations are traditionally based on a combination of attributes about the user such as demographics, purchase history, interactions such as clickstreams, and product ratings. For recommendations on products where aesthetics can influence a purchase, visual similarity scores between previously purchased products, and other product offerings can be factored into product recommendations.

FIG. 1 illustrates a system for determining similarity between two or more images. For example, the similarity may be made by a comparison of an image against another image; a comparison of a image against a batch of images, a comparison of an image against a set of two or more images (with a configurable impact of style and content each image contributes to a score), a comparison of an image to an index, etc.

A client 110 communicates through an interface 104 (such as an API gateway, etc.) to a neural-style inference service/module 150. The client 110 is typically software executing on a machine and may include, but is not limited to: a browser communication with a web server that may be a part of a provider network or web provider; an application running on a web server (such as a front-end application); etc. Depending upon the implementation, the client 110 may make API calls to the interface 104 which then accesses the neural-style inference service/module 150 and/or the interface 104 may generate API calls to the neural-style inference service/module 150. Note that service/module indicates that the component may be service (such as a service of a provider network) or a component of one or more software programs.

The neural-style inference service/module 150 consists of multiple components including, but not necessarily, one or more neural-style inference model(s) 151, a content and style measurement service/module 153, a scoring/indexing service/module 160, and/or a similarity module 155.

The one or more neural-style inference model(s) 151 comprise one or more CNNs. A CNN includes plurality of layers of small computational units that process visual information in a feed-forward manner Each layer is a collection of image filters that each extract a certain feature from the input image. The output of a given layer consists of so-called feature maps: differently filtered versions of the input image.

CNNs develop a representation of the image that makes object information increasingly explicit along the processing hierarchy. The input image is transformed into representations that increasingly know about the actual content of the image compared to its detailed pixel values. Higher layers in the network capture the high-level content in terms of objects and their arrangement in the input image To obtain a representation of the style of an input image, a feature space originally designed to capture texture information is used. This feature space is built on top of the filter responses in each layer of the network. It consists of the correlations between the different filter responses over the spatial extent of the feature maps. The size and complexity of local image structures from the input image increases along the hierarchy, a result that can be explained by the increasing receptive field sizes and feature complexity. This multi-scale representation is a style representation.

The content and style measurement service/module 153 calculates content from one or more layers of the neural-style inference model 151. Generally, each layer in the network defines a non-linear filter bank whose complexity in-creases with the position of the layer in the network.

Hence a given input image $\vec{x}$ is encoded in each layer of the CNN by the filter responses to that image. A layer with $N_l$ distinct filters has $N_l$ feature maps each of size $M_l$, where $M_l$ is the height times the width of the feature map. So the responses in a layer l can be stored in a matrix $F_{ij}^l \in R^{Nl \times Ml}$ where $F_{ij}^l$ is the activation of the $i^{th}$ filter at position i in layer l. To visualize the image information that is encoded at different layers of the hierarchy gradient descent is performed on a white noise image to find another image that matches the feature responses of the original image. So let $\vec{p}$ and $\vec{x}$ be the original image and the image that is generated and $P^l$ and $F^l$ their respective feature representation in layer l.

Content of a layer is defined as:

$$a\mathcal{L}_{content}(\vec{p}, \vec{x}) = \frac{1}{2}\sum_{i,j} (F_{ij}^l - P_{ij}^l)^2$$

On top of the CNN responses in each layer of the network is a style representation that computes the correlations between the different filter responses, where the expectation is taken over the spatial extend of the input image. These feature correlations are given by the Gram matrix $G^l \in R^{Nl \times Nl}$, where $G^l$ is the inner product between the vectorized feature map total loss is:

$$\beta\mathcal{L}_{style}(\vec{a}, \vec{x}) = G_{ij}^l = \sum_{k} F_{ik}^l F_{jk}^l$$

The blend of weighted content and style values for a score of the image which is the output of the content and style measurement service/module 153:

$$\text{Imagescore} = \alpha L_{content}(\vec{p}, \vec{x}) + \beta L_{style}(\vec{a}, \vec{x})$$

When used, the scoring/indexing service/module 160 scores/indexes images in image storage 170 based on their image score from the content and style measurement service/module 153. The indexing allows for a quicker retrieval of "similar" images and/or provides the similarity module 155 a plurality of image scores to compare. In some embodiments, a KNN index is built. In other embodiments, the scoring/indexing service/module 160 uses database indexes. As such, gram matrices (style) and vector distances (content) for selected layers are calculated and stored in a database. As new images are added to the image storage 170, new values are added and stored them in the database.

The similarity module 155 compares image scores to determine which images are most similar (the delta between the scores is smallest). The output of the similarity module 155 may include one or more of similarity scores between two or more images and/or an index for fast lookup.

A model configuration storage 180 stores one or more configurations of how to calculate style and content. This configurability provides users means to change the search results based on tastes. This allow for flexibility to address the subjective nature of this style similarity analysis. A configuration may contain one or more of: content extraction layers identifiers, and layer weightings (which layers to use to extract the "structural" features of the image and weights to scale the influence each layer has on the overall score generated); style extraction layers identifiers, and layer weightings (which layers to use to extracts the "stylistic" features of the image and weights to scale the influence each layer has on the overall score generated; a ratio of content versus style influence (such as 50:50), an internal configuration of the model (e.g., ResNet, VGG, etc.); and/or image storage information.

Note that the early layers of the network can be treated as configurations to weight the influence of color. Early to mid-activation layers weight the influence of texture. Content extraction on deep layers influence shape. These can be treated as fuzzy guidance to make the system usable for non-expert users.

Finally, a model/layer inspector 152 may be used to provide visualization of the activation layers in the model to help a user determine optimal configurations for this system.

Note that the neural-style inference service/module 150 and model/layer inspector 152 are software executed in hardware.

Figure 2:
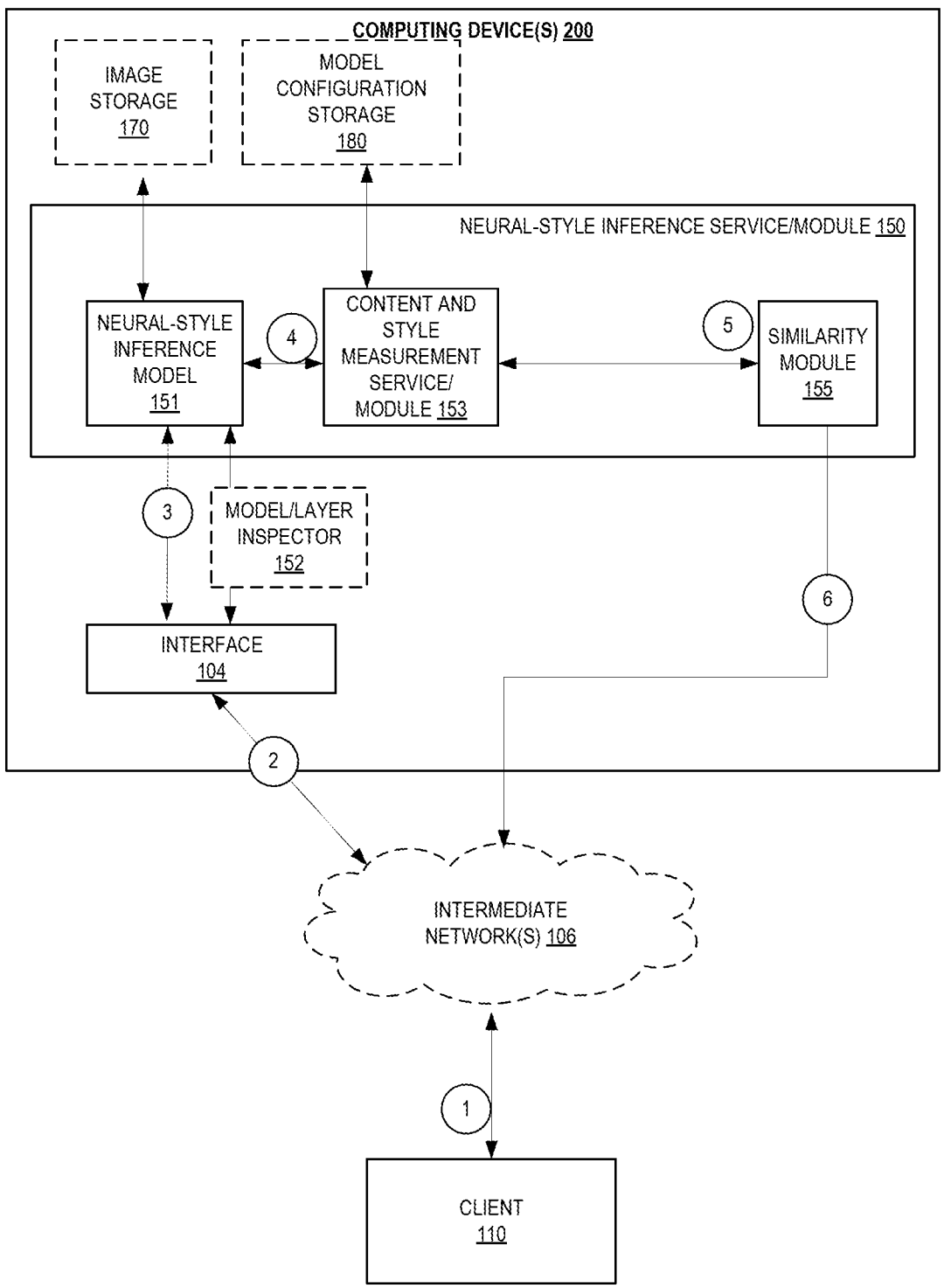
FIG. 2 illustrates a illustrates a system for determining similarity between two or more images.

FIG. 2 illustrates a illustrates a system for determining similarity between two or more images. In particular, this illustration shows comparing two images from a request where both images are supplied by the request. Note the numbering is the same as FIG. 1.

The neural style inference service/module 150, etc. are a part of, or executed by, computing device(s) 200. In some embodiments, aspects of computing device(s) are a part of a provider network which provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks may utilize one or more user accounts that are associated with a customer account, though these terms may be used somewhat interchangeably depending upon the context of use. Users may interact with the computing device(s) 100 across one or more intermediate networks 106 (e.g., the internet) via one or more interface(s) 104, such as through use of application programming interface (API) calls, via a console implemented as a website or application, etc. The interface(s) 104 may be part of, or serve as a front-end to, a control plane of the computing device(s) 100 that includes "backend" services supporting and enabling the services that may be more directly offered.

To provide these and other computing resource services, provider networks often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

Note, in some embodiments, the client 110 and intermediate networks are also part of computing devices 200 (for example, they are a part of a provider network).

The circles with numbers in them represent an exemplary flow for using the neural-style inference service/module 150.

At circle 1, a request for a similarity comparison is made by the client 110. As noted above, the client 110 is software executing on hardware and may be a web browser, a part of an application, etc. The request may be in the form of an API call to the neural-style inference service/module 150. In other instances, the request is converted to an API call by interface 104. In this example, the request includes two or more images to compare.

The request is received by an interface 104 at circle 2. This interface 104 passes the request (or generates an API call to be sent) to the neural-style inference service/module 150 at circle 3.

The neural-style inference model 151 of the neural-style inference service/module 150 ingests this request and performs an inference according to the request. For each image to compare, the CNN of the neural-style inference model 151 is applied to the image and outputs of a proper subset of layers of the CNN are provided to the content and style measurement service/module 153 at circle 4. Which layers to use (and their weights) may be provided by a configuration of the model configuration storage 180.

The style measurement service/module 153 generates style and content values according to its configuration, blends those values, and passes the blended value to the similarity module 155 at circle 5. Note that the operations of the neural-style inference model 151 and the content and style measurement service/module 153 need to be performed per image to compare. How the style and content values are generated is detailed above.

The similarity module 155 determines which images are most similar based on their blended style and content values and passes a result of that determination to the client at circle 6. In some instances, the result goes through the intermediate network(s) 106.

Figure 3:
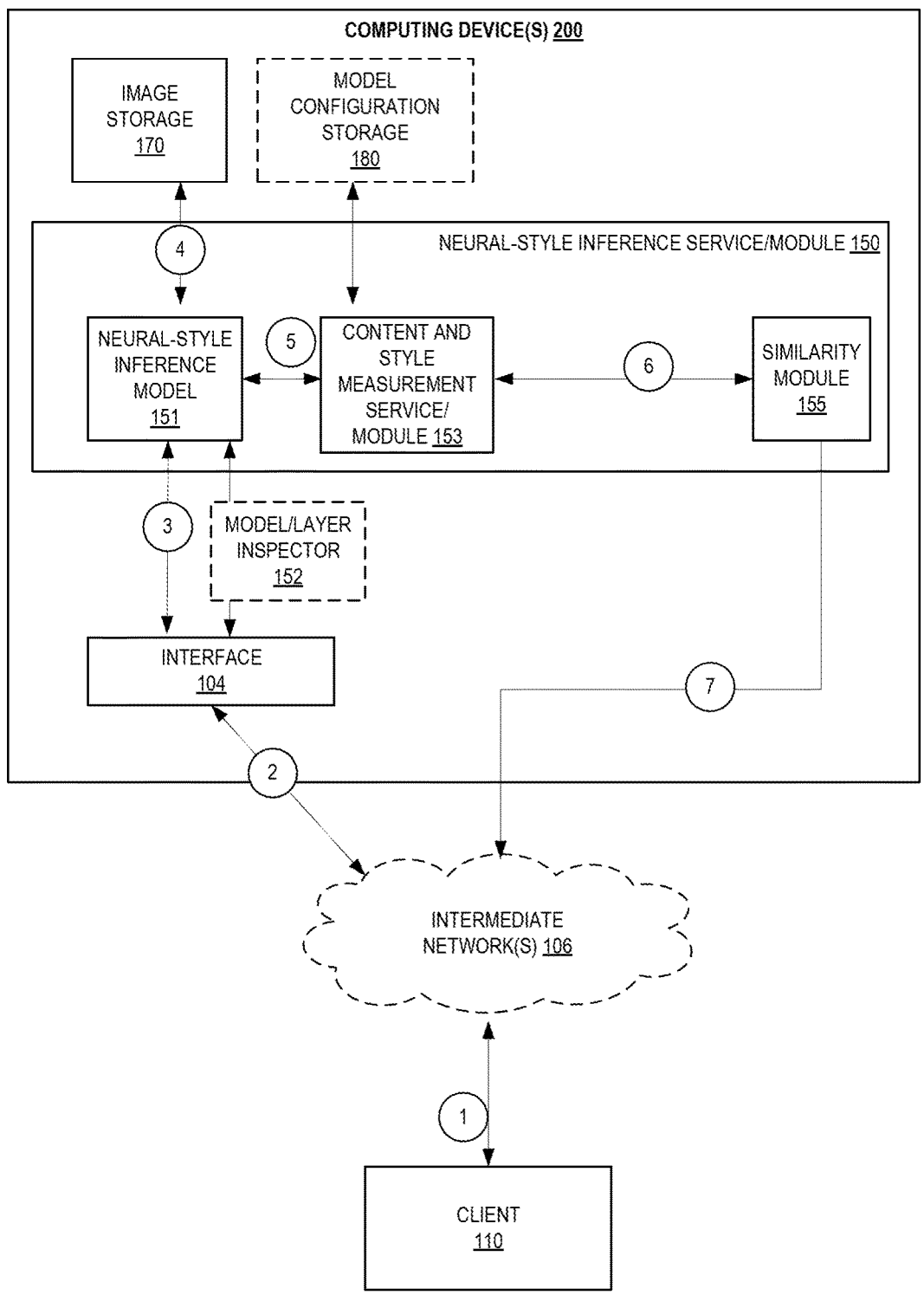
FIG. 3 illustrates a illustrates a system for determining similarity between two or more images.

FIG. 3 illustrates a illustrates a system for determining similarity between two or more images. In particular, this illustration shows comparing two images from a request where at least one image to compare is to be retrieved from image storage 170. Note the numbering is the same as FIG. 1. Again, the neural style inference service/module 150, etc. are a part of, or executed by, computing device(s) 200 as detailed above and, in some embodiments, the client 110 and intermediate networks are also part of computing devices 200 (for example, they are a part of a provider network). The circles with numbers in them represent an exemplary flow for using the neural-style inference service/module 150.

At circle 1, a request for a similarity comparison is made by the client 110. As noted above, the client 110 is software executing on hardware and may be a web browser, a part of an application, etc. The request may be in the form of an API call to the neural-style inference service/module 150. In other instances, the request is converted to an API call by interface 104. In this example, the request either includes one or more images to compare, provides an indication of a location of at least one image to compare to a base image, or a combination thereof. For example, the request may include a location to a base image and images to compare that base to, or include a base image and a location of images to compare that base to, etc.

The request is received by an interface 104 at circle 2. This interface 104 passes the request (or generates an API call to be sent) to the neural-style inference service/module 150 at circle 3.

The neural-style inference model 151 of the neural-style inference service/module 150 ingests this request and performs an inference according to the request. This includes retrieving one or more images from image storage 170 at circle 4. For each image to compare, the CNN of the neural-style inference model 151 is applied to the image and outputs of a proper subset of layers of the CNN are provided to the content and style measurement service/module 153 at circle 5. Which layers to use (and their weights) may be provided by a configuration of the model configuration storage 180.

The style measurement service/module 153 generates style and content values according to its configuration, blends those values, and passes the blended value to the similarity module 155 at circle 6. Note that the operations of the neural-style inference model 151 and the content and style measurement service/module 153 need to be performed per image to compare. How the style and content values are generated is detailed above.

The similarity module 155 determines which images are most similar based on their blended style and content values and passes a result of that determination to the client at circle 7. In some instances, the result goes through the intermediate network(s) 106.

Figure 4:
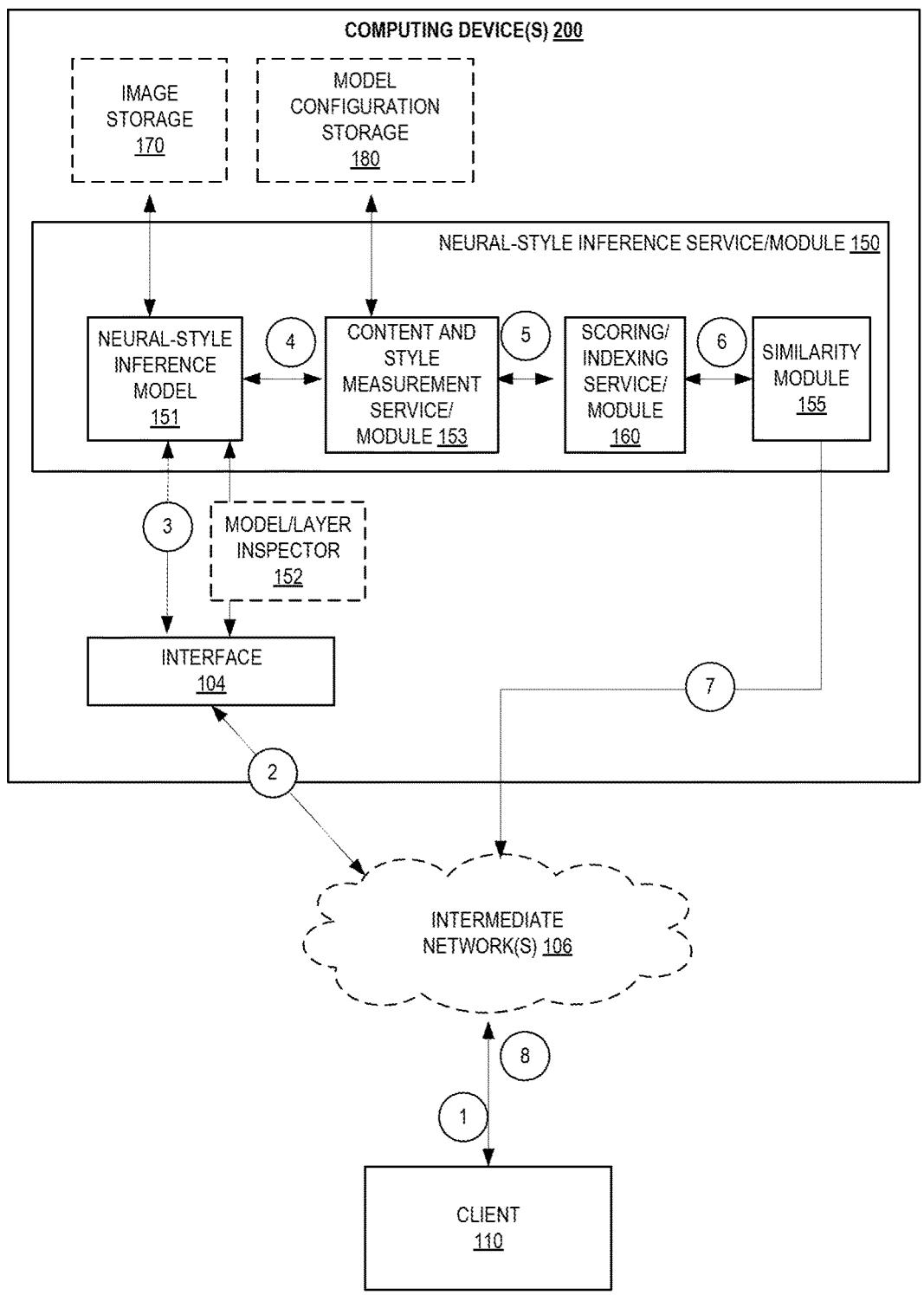
FIG. 4 illustrates a illustrates a system for determining similarity between two or more images.

FIG. 4 illustrates a illustrates a system for determining similarity between two or more images. In particular, this illustration shows comparing an image from a request to indexes of previously evaluated images. Note the numbering is the same as FIG. 1. Again, the neural style inference service/module 150, etc. are a part of, or executed by, computing device(s) 200 as detailed above and, in some embodiments, the client 110 and intermediate networks are also part of computing devices 200 (for example, they are a part of a provider network). The circles with numbers in them represent an exemplary flow for using the neural-style inference service/module 150.

At circle 1, a request for a similarity comparison is made by the client 110. As noted above, the client 110 is software executing on hardware and may be a web browser, a part of an application, etc. The request may be in the form of an API call to the neural-style inference service/module 150. In other instances, the request is converted to an API call by interface 104. In this example, the request either includes an image compare to an index of images or provides an indication of a location of an image to compare to an index of images.

The request is received by an interface 104 at circle 2. This interface 104 passes the request (or generates an API call to be sent) to the neural-style inference service/module 150 at circle 3.

The neural-style inference model 151 of the neural-style inference service/module 150 ingests this request and performs an inference according to the request. This may include retrieving an image from image storage 170. The CNN of the neural-style inference model 151 is applied to the image and outputs of a proper subset of layers of the CNN are provided to the content and style measurement service/module 153 at circle 4. Which layers to use (and their weights) may be provided by a configuration of the model configuration storage 180.

The style measurement service/module 153 generates style and content values according to its configuration, blends those values, and passes the blended value to the similarity module 155 at circle 5. Note that the operations of the neural-style inference model 151 and the content and style measurement service/module 153 need to be performed per image to compare. How the style and content values are generated is detailed above.

The scoring/indexing service/module 160 takes in the blend value and compares that to blended values of previously evaluated images. The scoring/indexing service/module 160 returns a set of scores that are similar to the image of the request.

The similarity module 155 determines which indexed images are most similar based on their blended style and content values and passes a result of that determination to the client at circle 7. In some instances, the result goes through the intermediate network(s) 106.

Figure 5:
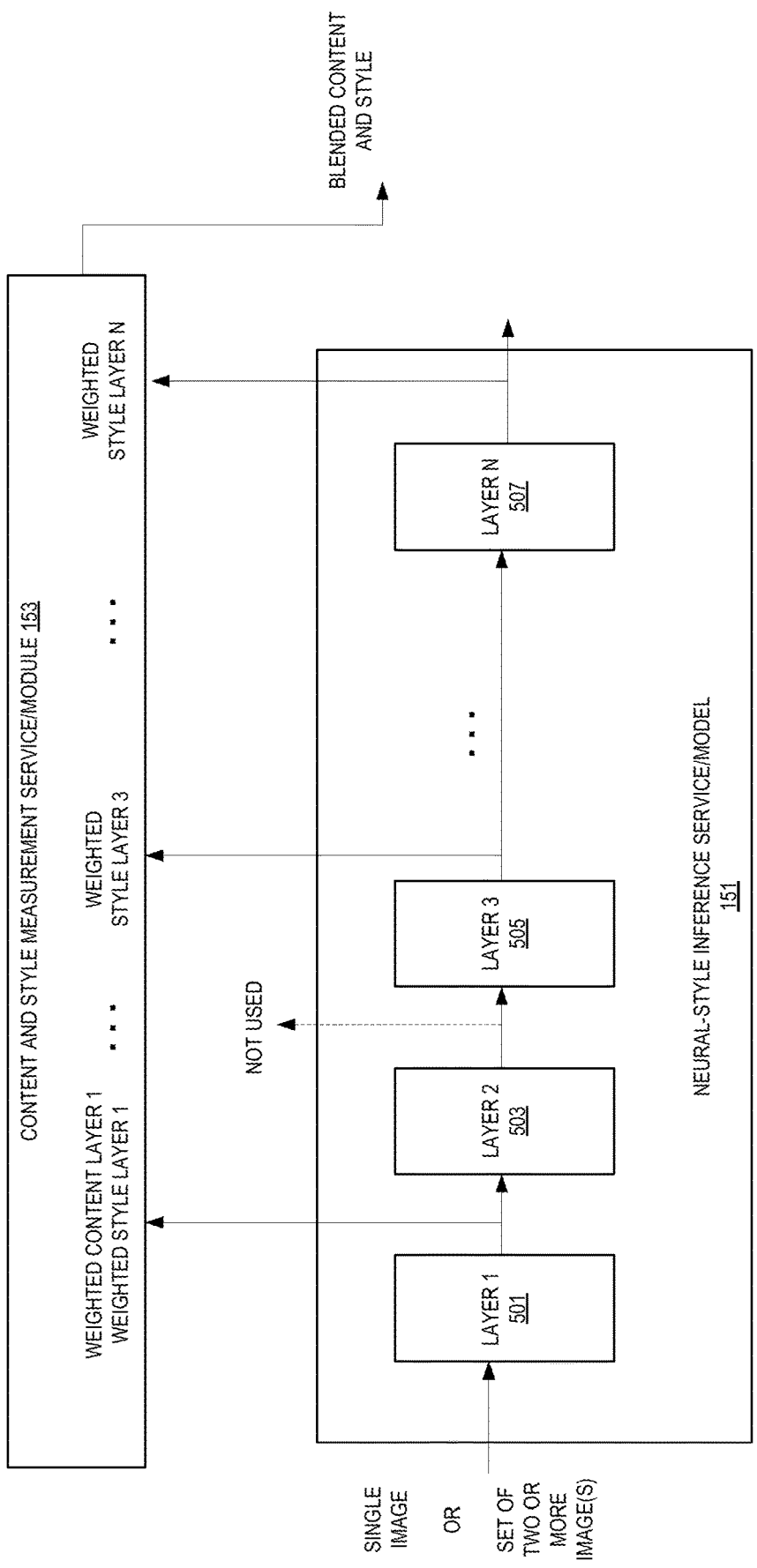
FIG. 5 illustrates embodiments of interactions between a neural-style inference model and a content and style measurement service/module to generate a blended content and style value for an image.

FIG. 5 illustrates embodiments of interactions between a neural-style inference model and a content and style measurement service/module to generate a blended content and style value for a single image and/or a set of two or more images. As shown, the neural-style inference model 151 includes a plurality of layers 501-507. In this example (showing a single image being measured), the weighted content value is derived by the content and style measure service/module 153 from only the output of the activation function of layer 1 501. The weighted style value is a combination (such as a summation) of the output of the activation functions of layers 1, 3, and N (501, 505, and 507). Note that each layer may be weighted independently and/or not used (for example, layer 2 is not used).

The content and style measurement service/module 153 blends the style value and the content value (such as adding them) to generate a blended content and style value for the image.

When a set of two or more images are evaluated, each image of the set is processed by the neural-style inference model 151 and weighted content and style values are determined as with a single image. These weighted content and style are then summed according to an impact value. For example, a first image may make up 70% of the end weighted content and style with the other image making up the remaining 30%. In essence, a second weight is applied.

Figure 6:
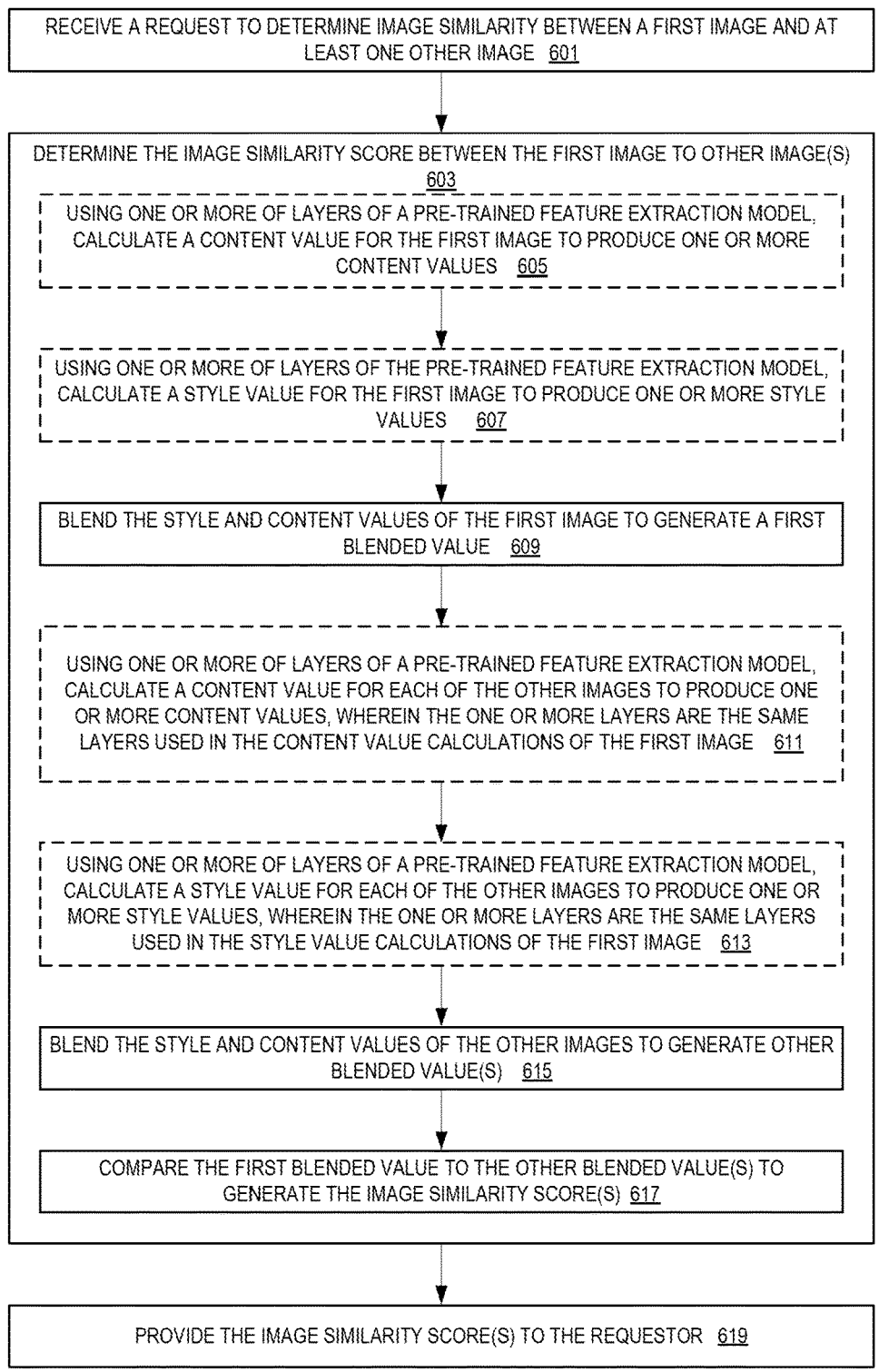
FIG. 6 is a flow diagram illustrating operations of a method for providing a similarity score between two or more images according to some embodiments.

FIG. 6 is a flow diagram illustrating operations of a method for providing a similarity score between two or more images according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the neural-style inference model 141, content and style measurement service/module 153, scoring/indexing service/module 160, and/or similarity module 155 of the other figures. The pre-trained neural-style inference model is typically a feature extraction model such as an image classifier.

At 601, a request to determine image similarity score between a first image and at least one other image is received. For example, an API request is received. The request may include one or more images, an identification of a pre-trained neural-style inference model 141 to use, an indication of a location of one or more images, etc.

A determination of the image similarity score between a first image to at least one other image is made at 603. This act may include several sub acts as shown.

In some embodiments, at 605, a content value, based on one or more of layers of the pre-trained image neural-style inference model, for the first image is calculated. Note the content value may take into account a plurality of content values from a plurality of layers and which layers to utilize may be provided by a configuration.

In some embodiments, at 607, a style value, based on one or more of layers of the pre-trained image neural-style inference model, for the first image is calculated. Note the content value may take into account a plurality of content values from a plurality of layers and which layers to utilize may be provided by a configuration.

Note that in some embodiments, both style and content are used and in other embodiments just one is.

The calculated style and content values of the first image are blended to generate a first blended value at 609.

At 611, a content value for each of the other images are calculated in the same manner as the first image. As such, the same layers used in the content value calculations of the first image and other images.

At 613, a style value for each of the other images are calculated in the same manner as the first image. As such, the same layers used in the style value calculations of the first image and other images.

In some embodiments, when a set of two or more images are to be compared against the first image, each image is evaluated according to 611 and/or 613. Their weighted content and style are then summed according to a secondary weighting.

Note that the calculation of values only occurs when style and/or content are used.

The calculated style and content values of the other images are independently blended to generate other blended values at 615. In the case of a set of images, the blend is based upon the secondary weight.

The first blended value is compared to the other blended value(s) to generate the image similarity score(s) at 617.

The image similarity score(s) are provided to the requestor at 615.

Figure 7:
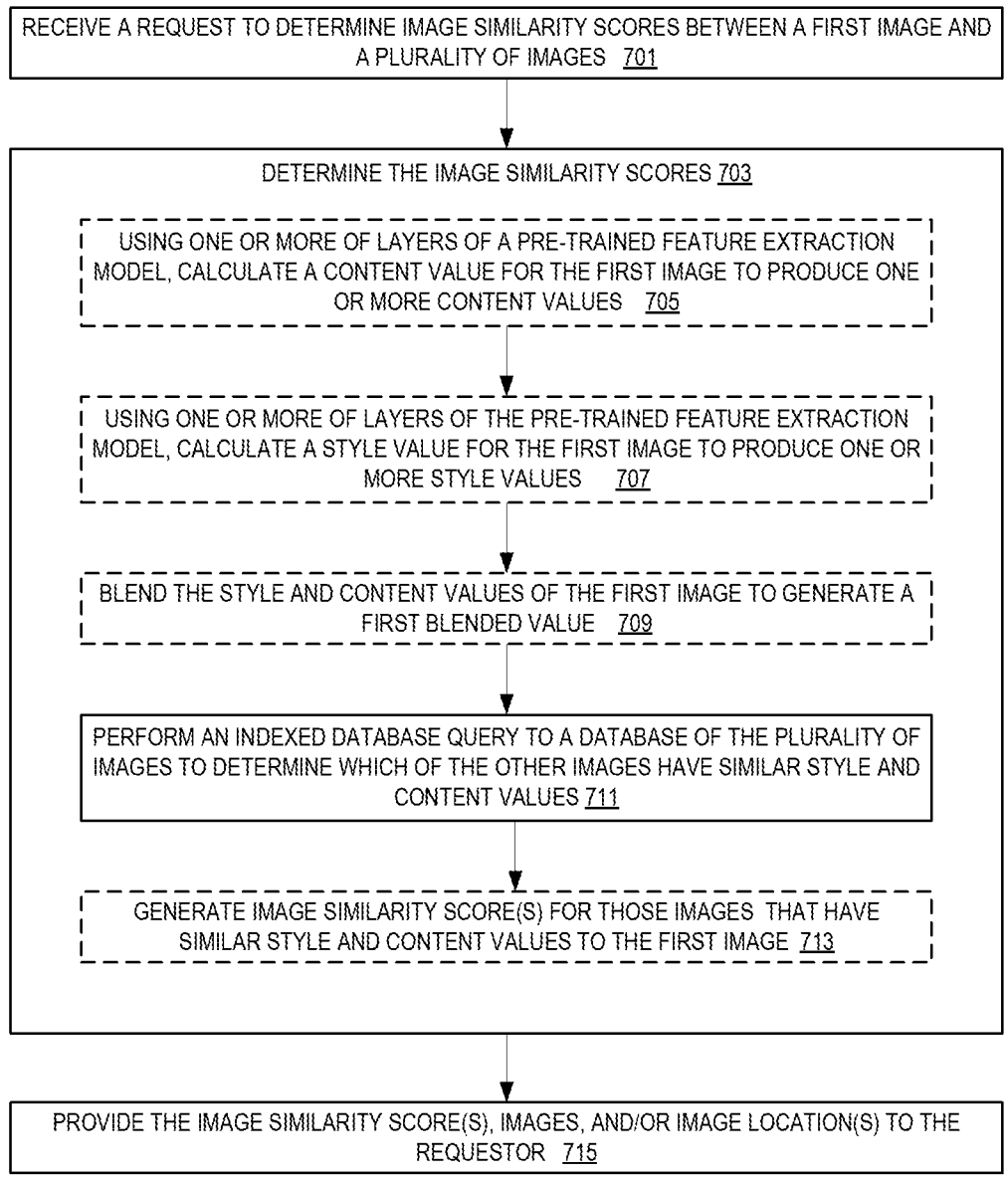
FIG. 7 is a flow diagram illustrating operations of a method for providing a similarity score between two or more images according to some embodiments.

FIG. 7 is a flow diagram illustrating operations of a method for providing a similarity score between two or more images according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the neural-style inference model 141, content and style measurement service/module 153, scoring/indexing service/module 160, and/or similarity module 155 of the other figures.

At 701, a request to determine image similarity score between a first image and a plurality of other images is received. For example, an API request is received. The request may include one or more images, an identification of a pre-trained neural-style inference model 141 to use, an indication of a location of two or more images, etc. The pre-trained neural-style inference model is typically a feature extraction model such as an image classifier.

A determination of the image similarity score between a first image to at least one other image is made at 703. This act may include several sub acts as shown.

In some embodiments, at 705, a content value, based on one or more of layers of the pre-trained image neural-style inference model, for the first image is calculated. Note the content value may take into account a plurality of content values from a plurality of layers and which layers to utilize may be provided by a configuration.

In some embodiments, at 707, a style value, based on one or more of layers of the pre-trained image neural-style inference model, for the first image is calculated. Note the content value may take into account a plurality of content values from a plurality of layers and which layers to utilize may be provided by a configuration.

Note that in some embodiments, both style and content are used and in other embodiments just one is.

In some embodiments, the calculated style and content values of the first image are blended to generate a first blended value at 709. In other embodiments, the style and content values are kept separate.

At 711, an indexed database query to a database of the plurality of images to determine images that have a similar style and content values. In some embodiments, this query is based on blended style and content values. In other embodiments, the query is based on independent style and content values. Note that the database values have been pre-calculated.

In some embodiments, image similarity score(s) for those images that have similar style and content values to the first image are calculated at 713.

The image similarity score(s), images that are similar to the first image, and/or locations of images that are similar to the first image are provided to the requestor at 715.

Note that in some embodiments, caching is applied to request as a part of a web application or database such that if a request is cached there may be no need to perform a query.

Figure 8:
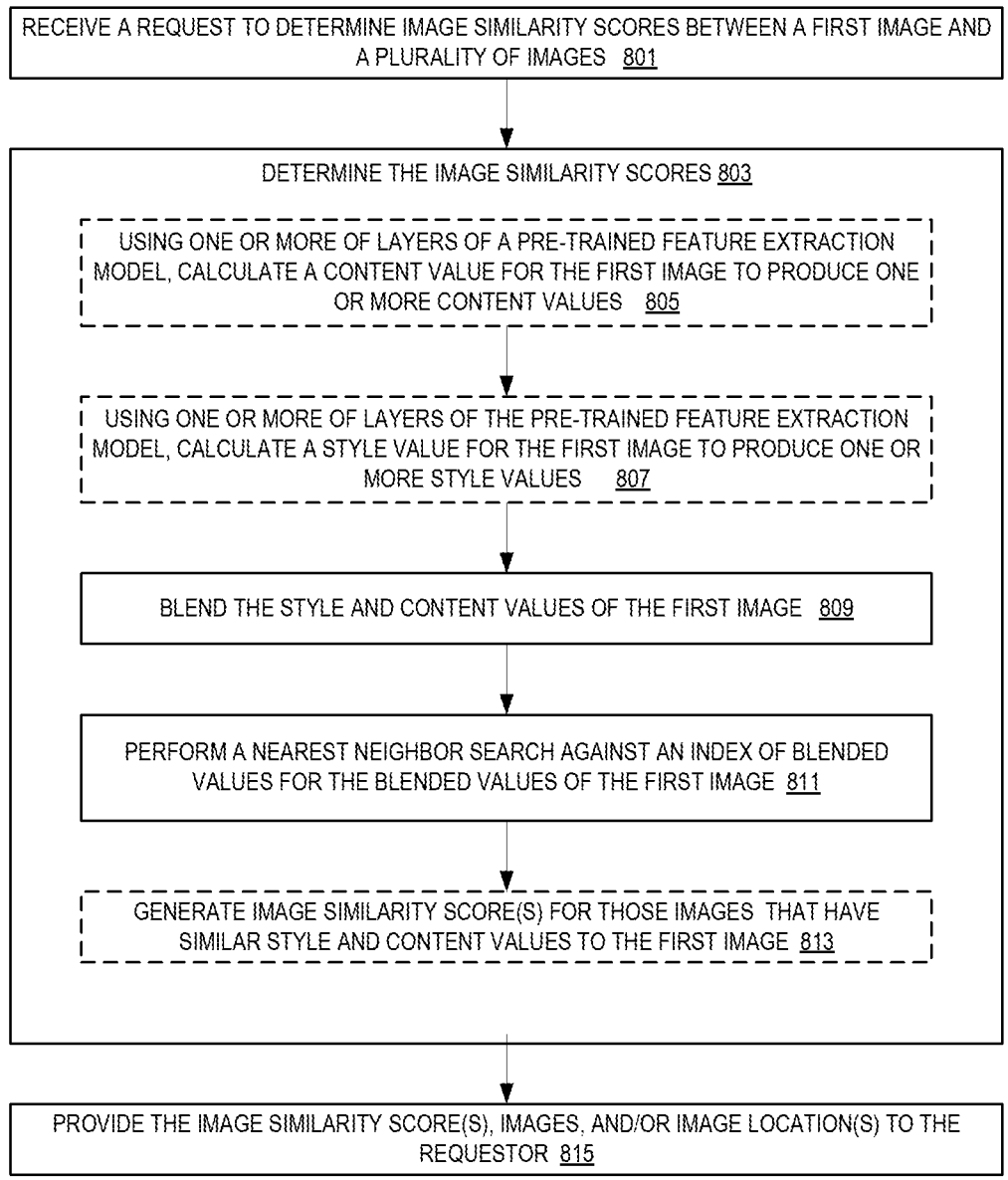
FIG. 8 is a flow diagram illustrating operations of a method for providing a similarity score between two or more images according to some embodiments.

FIG. 8 is a flow diagram illustrating operations of a method for providing a similarity score between two or more images according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the neural-style inference model 141, content and style measurement service/module 153, scoring/indexing service/module 160, and/or similarity module 155 of the other figures.

At 801, a request to determine image similarity score between a first image and a plurality of other images is received. For example, an API request is received. The request may include one or more images, an identification of a pre-trained neural-style inference model 141 to use, an indication of a location of two or more images, etc. The pre-trained neural-style inference model is typically a feature extraction model such as an image classifier.

A determination of the image similarity score between a first image to at least one other image is made at 803. This act may include several sub acts as shown.

In some embodiments, at 805, a content value, based on one or more of layers of the pre-trained image neural-style inference model, for the first image is calculated. Note the content value may take into account a plurality of content values from a plurality of layers and which layers to utilize may be provided by a configuration.

In some embodiments, at 807, a style value, based on one or more of layers of the pre-trained image neural-style inference model, for the first image is calculated. Note the content value may take into account a plurality of content values from a plurality of layers and which layers to utilize may be provided by a configuration.

Note that the calculation of values only occurs when style and/or content are used.

In some embodiments, the calculated style and content values of the first image are blended to generate a first blended value at 809. In other embodiments, the style and content values are kept separate.

At 811, a nearest neighbor search against an index of blended values for the first image is made. In some embodiments, this query is based on blended style and content values. In other embodiments, the query is based on independent style and content values. Note that the values have been pre-calculated.

In some embodiments, image similarity score(s) for those images that have similar style and content values to the first image are calculated at 813.

The image similarity score(s), locations of one or more "nearest" images and/or images are provided to the requestor at 815.

Figure 9:
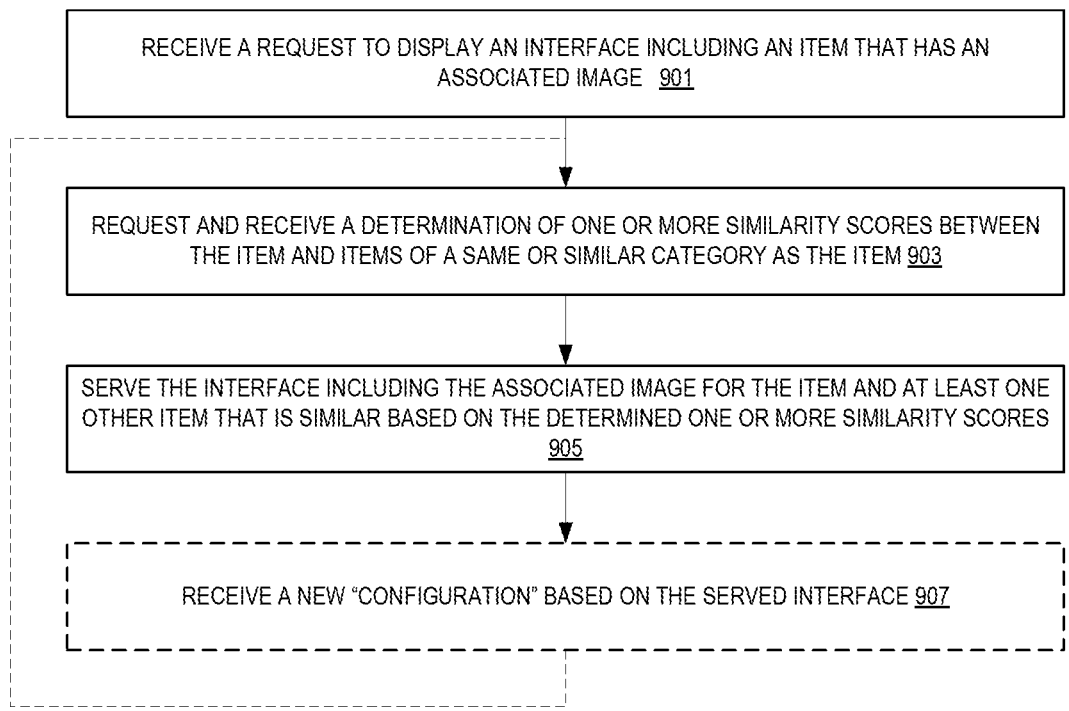
FIG. 9 is a flow diagram illustrating operations of a method utilizing image similarity according to some embodiments.

FIG. 9 is a flow diagram illustrating operations of a method utilizing image similarity according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

At 901, a request to display an interface including an item that has an associated image is received. For example, a user or application sends a request to "website.com" and that page includes a displayable item. As an example, a user may take a picture of an item to a and submit that picture as a part of a request to find the item itself or similar items.

A request and response for a determination one or more similarity scores between the item and items of a same or similar category as the item is made at 903. For example, a request is made to a neural-style inference service/module. This request may be in the form of an API call. As noted before, the request may indicate the item to compare against, etc.

After the neural-style inference service/module as returned a result (either similarity scores, locations of "similar" images, "similar" images, etc.), the interface including the associated image for the item and an image of at least one other item that is similar based on the determined one or more similarity scores is served at 905.

In some embodiments, a user viewing the resulting interface may provide suggestions as to the result at 907. These suggestions form a different configuration which is then used to determine similarity between two or more images. For example, a user may identify which results are better, etc. and a new configuration is generated by the application that requested the similarity search. In some embodiments, another search at 901 is made that specifies the weighting between gram matrices (style) and vector distance measures (content).

Figure 10:
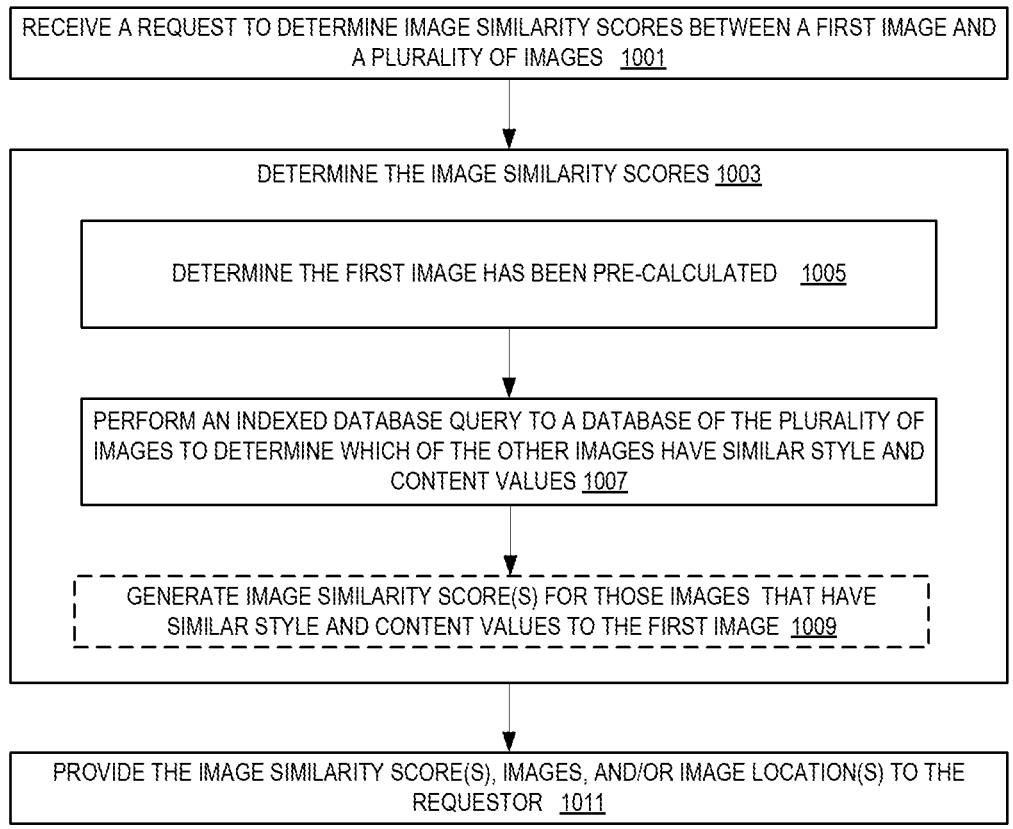
FIG. 10 is a flow diagram illustrating operations of a method for providing a similarity score between two or more images according to some embodiments.

FIG. 10 is a flow diagram illustrating operations of a method for providing a similarity score between two or more images according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the neural-style inference model 141, content and style measurement service/module 153, scoring/indexing service/module 160, and/or similarity module 155 of the other figures.

At 1001, a request to determine image similarity score between a first image and a plurality of other images is received. For example, an API request is received. The request may include one or more images, an identification of a pre-trained neural-style inference model 141 to use, an indication of a location of two or more images, etc. The pre-trained neural-style inference model is typically a feature extraction model such as an image classifier.

A determination of the image similarity score between a first image to at least one other image is made at 1003. This act may include several sub acts as shown.

At 1005 a determination that the first image has already had content and/or style values calculated is made.

At 1007, an indexed database query to a database of the plurality of images to determine images that have a similar style and content values. In some embodiments, this query is based on blended style and content values. In other embodiments, the query is based on independent style and content values. Note that the database values have been pre-calculated.

In some embodiments, image similarity score(s) for those images that have similar style and content values to the first image are calculated at 1009.

The image similarity score(s), images that are similar to the first image, and/or locations of images that are similar to the first image are provided to the requestor at 1011.

Note that in some embodiments, caching is applied to request as a part of a web application or database such that if a request is cached there may be no need to perform a query.

FIG. 11 illustrates an example of an index schema for images. As shown, entries of the database may include an image ID 1101, a layer identifier 1103, a type 1105, and a measure 1107. For example, the first entry is for image 2 and has a measurement for style using layer 1.

Queries may be made based on one or more of the fields. The queries may return a blended score, etc.

Figure 12:
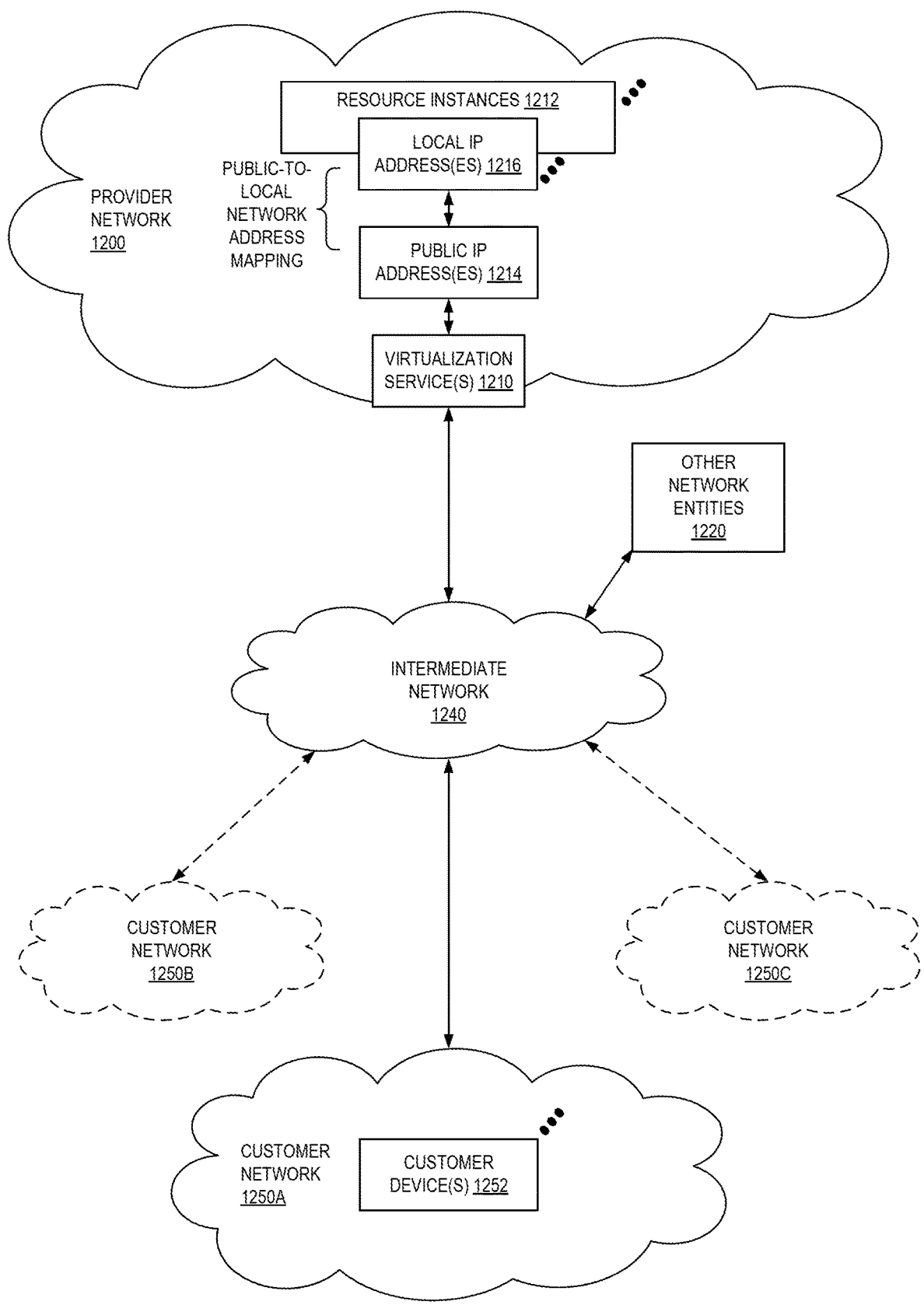
FIG. 12 illustrates an example provider network environment according to some embodiments.

FIG. 12 illustrates an example provider network (or "service provider system") environment according to some embodiments. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
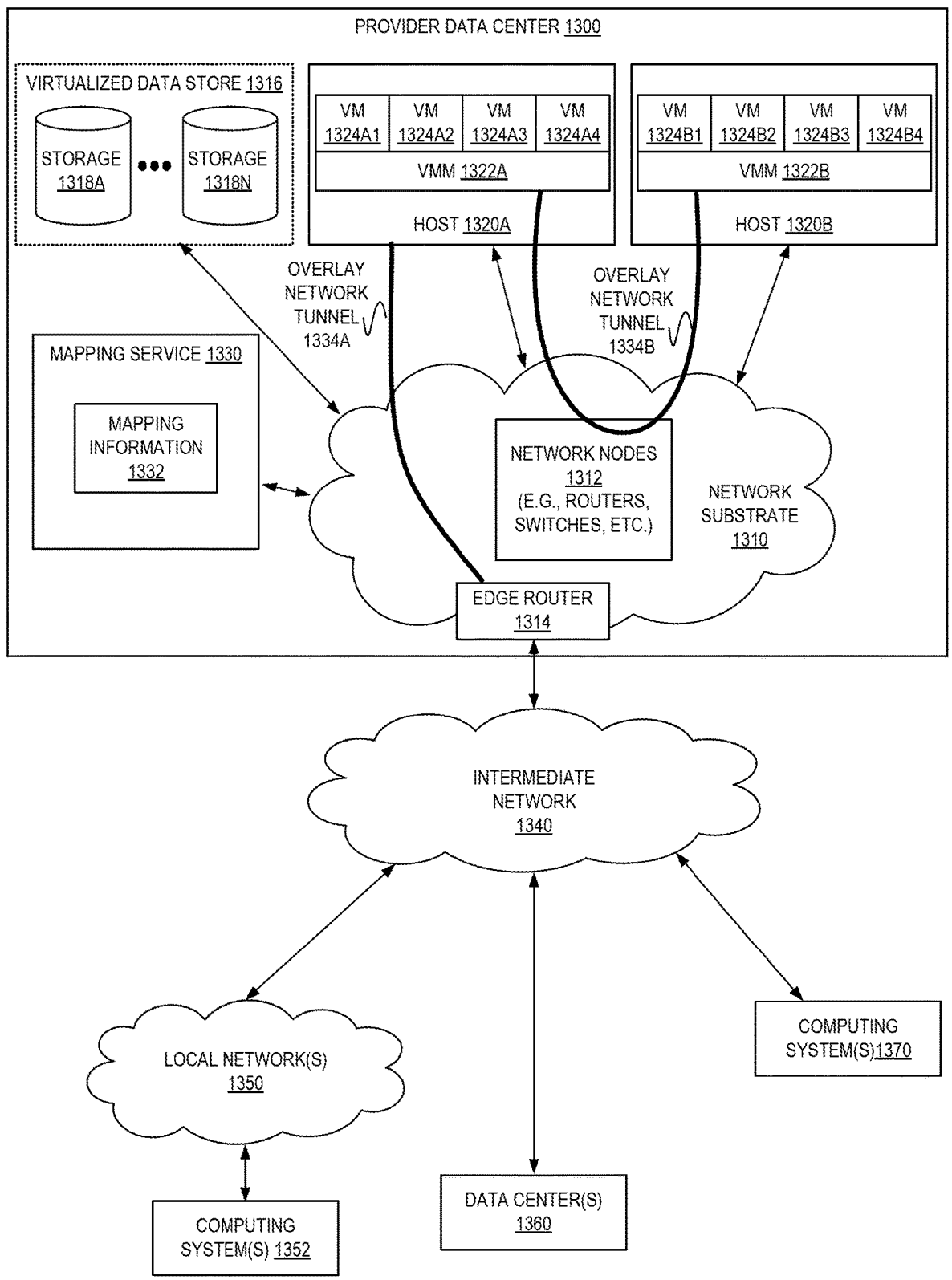
FIG. 13 illustrates an example data center that implements an overlay network on a network substrate using IP tunneling technology according to some embodiments.

FIG. 13 illustrates an example data center that implements an overlay network on a network substrate using IP tunneling technology, according to some embodiments. A provider data center 1300 may include a network substrate that includes networking nodes 1312 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1310 using tunnels. The IP tunneling technology may provide a mapping and encapsulating system for creating an overlay network on a network (e.g., a local network in data center 1300 of FIG. 13) and may provide a separate namespace for the overlay layer (the public IP addresses) and the network substrate 1310 layer (the local IP addresses). Packets in the overlay layer may be checked against a mapping directory (e.g., provided by mapping service 1330) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1330) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 13, an example overlay network tunnel 1334A from a virtual machine (VM) 1324A (of VMs 1324A1-1324A4, via VMM 1322A) on host 1320A to a device on the intermediate network 1350 and an example overlay network tunnel 1334B between a VM 1324A (of VMs 1324A1-1324A4, via VMM 1322A) on host 1320A and a VM 1324B (of VMs 1324B1-1324B4, via VMM 1322B) on host 1320B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 13, at least some networks in which embodiments may be implemented may include hardware virtualization technology that enables multiple operating systems to run concurrently on a host computer (e.g., hosts 1320A and 1320B of FIG. 13), i.e. as virtual machines (VMs) 1324 on the hosts 1320. The VMs 1324 may, for example, be executed in slots on the hosts 1320 that are rented or leased to customers of a network provider. A hypervisor, or virtual machine monitor (VMM) 1322, on a host 1320 presents the VMs 1324 on the host with a virtual platform and monitors the execution of the VMs 1324. Each VM 1324 may be provided with one or more local IP addresses; the VMM 1322 on a host 1320 may be aware of the local IP addresses of the VMs 1324 on the host. A mapping service 1330 may be aware of (e.g., via stored mapping information 1332) network IP prefixes and IP addresses of routers or other devices serving IP addresses on the local network. This includes the IP addresses of the VMMs 1322 serving multiple VMs 1324. The mapping service 1330 may be centralized, for example on a server system, or alternatively may be distributed among two or more server systems or other devices on the network. A network may, for example, use the mapping service technology and IP tunneling technology to, for example, route data packets between VMs 1324 on different hosts 1320 within the data center 1300 network; note that an interior gateway protocol (IGP) may be used to exchange routing information within such a local network.

In addition, a network such as the provider data center 1300 network (which is sometimes referred to as an autonomous system (AS)) may use the mapping service technology, IP tunneling technology, and routing service technology to route packets from the VMs 1324 to Internet destinations, and from Internet sources to the VMs 1324. Note that an external gateway protocol (EGP) or border gateway protocol (BGP) is typically used for Internet routing between sources and destinations on the Internet. FIG. 13 shows an example provider data center 1300 implementing a network that provides resource virtualization technology and that provides full Internet access via edge router(s) 1314 that connect to Internet transit providers, according to some embodiments. The provider data center 1300 may, for example, provide customers the ability to implement virtual computing systems (VMs 1324) via a hardware virtualization service and the ability to implement virtualized data stores 1316 on storage resources 1318A-1318N via a storage service.

The data center 1300 network may implement IP tunneling technology, mapping service technology, and a routing service technology to route traffic to and from virtualized resources, for example to route packets from the VMs 1324 on hosts 1320 in data center 1300 to Internet destinations, and from Internet sources to the VMs 1324. Internet sources and destinations may, for example, include computing systems 1370 connected to the intermediate network 1340 and computing systems 1352 connected to local networks 1350 that connect to the intermediate network 1340 (e.g., via edge router(s) 1314 that connect the network 1350 to Internet transit providers). The provider data center 1300 network may also route packets between resources in data center 1300, for example from a VM 1324 on a host 1320 in data center 1300 to other VMs 1324 on the same host or on other hosts 1320 in data center 1300.

A service provider that provides data center 1300 may also provide additional data center(s) 1360 that include hardware virtualization technology similar to data center 1300 and that may also be connected to intermediate network 1340. Packets may be forwarded from data center 1300 to other data centers 1360, for example from a VM 1324 on a host 1320 in data center 1300 to another VM on another host in another, similar data center 1360, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1318A-1318N, as virtualized resources to customers of a network provider in a similar manner.

Figure 14:
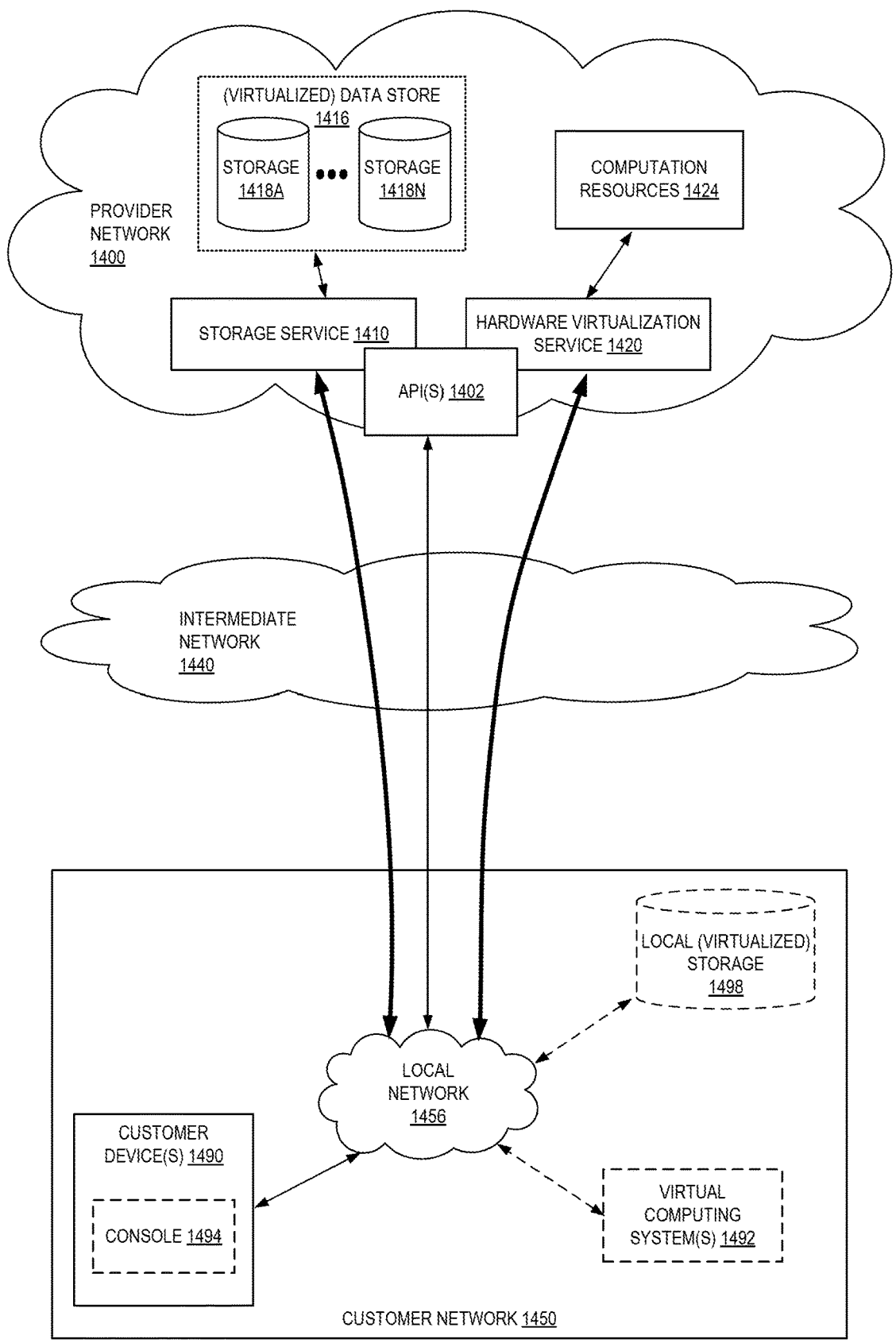
FIG. 14 is a block diagram of an example provider network that provides a storage service and a hardware virtualization service to customers according to some embodiments.

FIG. 14 is a block diagram of an example provider network that provides a storage service and a hardware virtualization service to customers, according to some embodiments. Hardware virtualization service 1420 provides multiple computation resources 1424 (e.g., VMs) to customers. The computation resources 1424 may, for example, be rented or leased to customers of the provider network 1400 (e.g., to a customer that implements customer network 1450). Each computation resource 1424 may be provided with one or more local IP addresses. Provider network 1400 may be configured to route packets from the local IP addresses of the computation resources 1424 to public Internet destinations, and from public Internet sources to the local IP addresses of computation resources 1424.

Provider network 1400 may provide a customer network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a customer network 1450 may access functionality provided by the hardware virtualization service 1420, for example via a console 1494 (e.g., a web-based application, standalone application, mobile application, etc.). In some embodiments, at the provider network 1400, each virtual computing system 1492 at customer network 1450 may correspond to a computation resource 1424 that is leased, rented, or otherwise provided to customer network 1450.

From an instance of a virtual computing system 1492 and/or another customer device 1490 (e.g., via console 1494), the customer may access the functionality of storage service 1410, for example via one or more APIs 1402, to access data from and store data to storage resources 1418A-1418N of a virtual data store 1416 (e.g., a folder or "bucket", a virtualized volume, a database, etc.) provided by the provider network 1400. In some embodiments, a virtualized data store gateway (not shown) may be provided at the customer network 1450 that may locally cache at least some data, for example frequently-accessed or critical data, and that may communicate with storage service 1410 via one or more communications channels to upload new or modified data from a local cache so that the primary store of data (virtualized data store 1416) is maintained. In some embodiments, a user, via a virtual computing system 1492 and/or on another customer device 1490, may mount and access virtual data store 1416 volumes via storage service 1410 acting as a storage virtualization service, and these volumes may appear to the user as local (virtualized) storage 1498.

While not shown in FIG. 14, the virtualization service(s) may also be accessed from resource instances within the provider network 1400 via API(s) 1402. For example, a customer, appliance service provider, or other entity may access a virtualization service from within a respective virtual network on the provider network 1400 via an API 1402 to request allocation of one or more resource instances within the virtual network or within another virtual network.

Illustrative System

Figure 15:
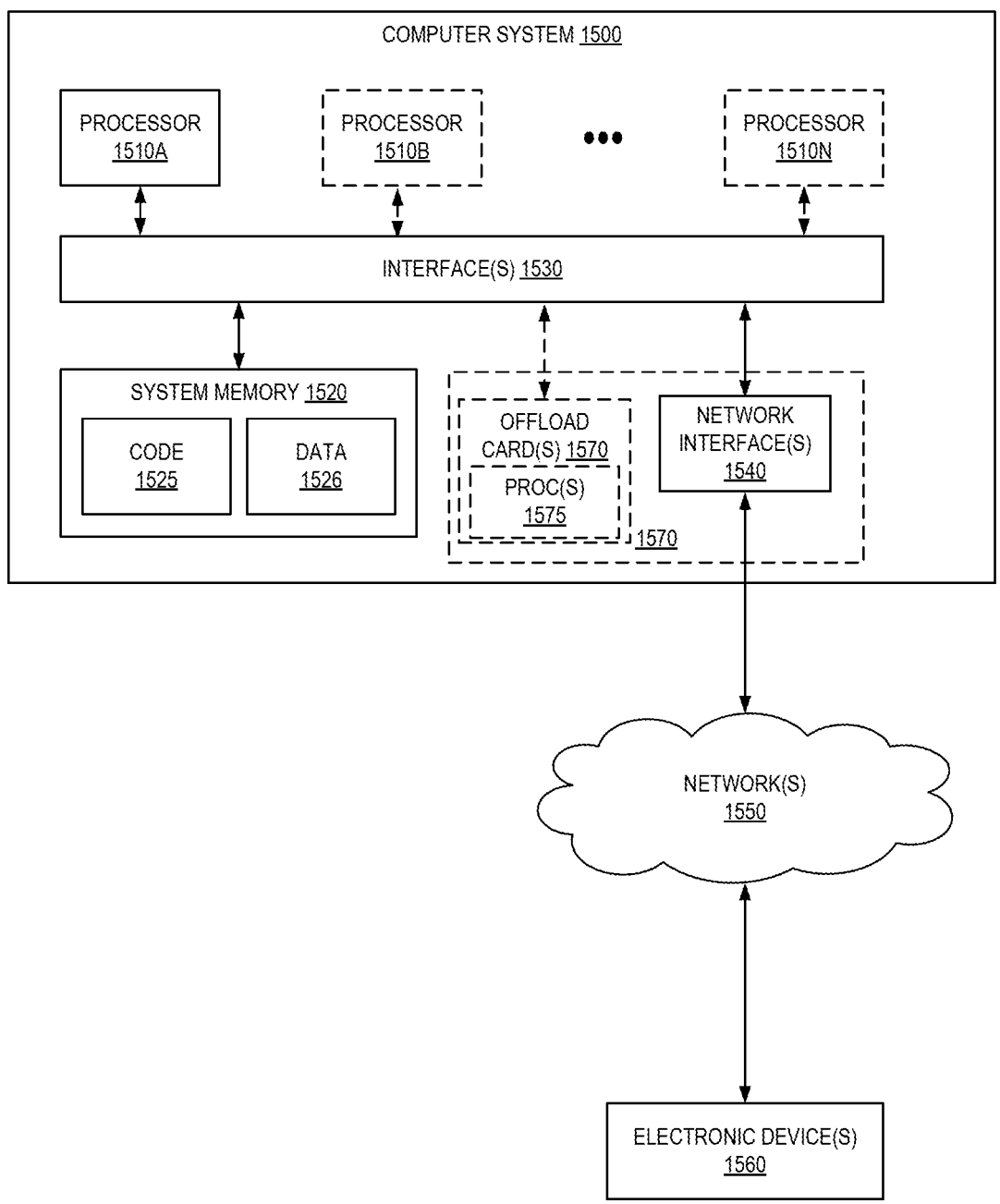
FIG. 15 is a block diagram illustrating an example computer system that may be used in some embodiments.

In some embodiments, a system that implements a portion or all of the techniques for determining and/or using image similarity as described herein may include a general-purpose computer system that includes or is configured to access one or more computer-accessible media, such as computer system 1500 illustrated in FIG. 15. In the illustrated embodiment, computer system 1500 includes one or more processors 1510 coupled to a system memory 1520 via an input/output (I/O) interface 1530. Computer system 1500 further includes a network interface 1540 coupled to I/O interface 1530. While FIG. 15 shows computer system 1500 as a single computing device, in various embodiments a computer system 1500 may include one computing device or any number of computing devices configured to work together as a single computer system 1500.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1510 may commonly, but not necessarily, implement the same ISA.

System memory 1520 may store instructions and data accessible by processor(s) 1510. In various embodiments, system memory 1520 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1520 as code 1525 and data 1526.

In one embodiment, I/O interface 1530 may be configured to coordinate I/O traffic between processor 1510, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices 1560 attached to a network or networks 1550, such as other computer systems or devices as illustrated in FIG. 1, for example. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1500 includes one or more offload cards 1570 (including one or more processors 1575, and possibly including the one or more network interfaces 1540) that are connected using an I/O interface 1530 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1500 may act as a host electronic device (e.g., operating as part of a hardware virtualization service) that hosts compute instances, and the one or more offload cards 1570 execute a virtualization manager that can manage compute instances that execute on the host electronic device. As an example, in some embodiments the offload card(s) 1570 can perform compute instance management operations such as pausing and/or un-pausing compute instances, launching and/or terminating compute instances, performing memory transfer/copying operations, etc. These management operations may, in some embodiments, be performed by the offload card(s) 1570 in coordination with a hypervisor (e.g., upon a request from a hypervisor) that is executed by the other processors 1510A-1510N of the computer system 1500. However, in some embodiments the virtualization manager implemented by the offload card(s) 1570 can accommodate requests from other entities (e.g., from compute instances themselves), and may not coordinate with (or service) any separate hypervisor.

In some embodiments, system memory 1520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

Figure 16:
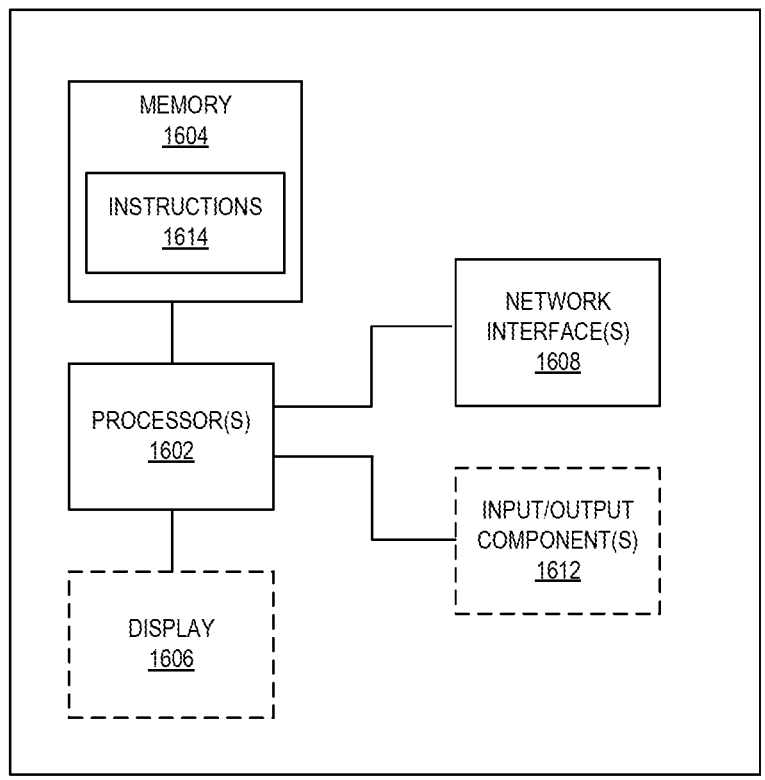
FIG. 16 illustrates a logical arrangement of a set of general components of an exemplary computing device that can be utilized in accordance with various embodiments.

FIG. 16 illustrates a logical arrangement of a set of general components of an example computing device 1600 such as those detailed above. Generally, a computing device 1600 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1602 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1604) to store code (e.g., instructions 1614) and/or data, and a set of one or more wired or wireless network interfaces 1608 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1604) of a given electronic device typically stores code (e.g., instructions 1614) for execution on the set of one or more processors 1602 of that electronic device. One or more parts of various embodiments may be implemented using different combinations of software, firmware, and/or hardware.

A computing device 1600 can include some type of display element 1606, such as a touch screen or liquid crystal display (LCD), although many devices such as portable media players might convey information via other means, such as through audio speakers, and other types of devices such as server end stations may not have a display element 1606 at all. As discussed, some computing devices used in some embodiments include at least one input and/or output component(s) 1612 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 17:
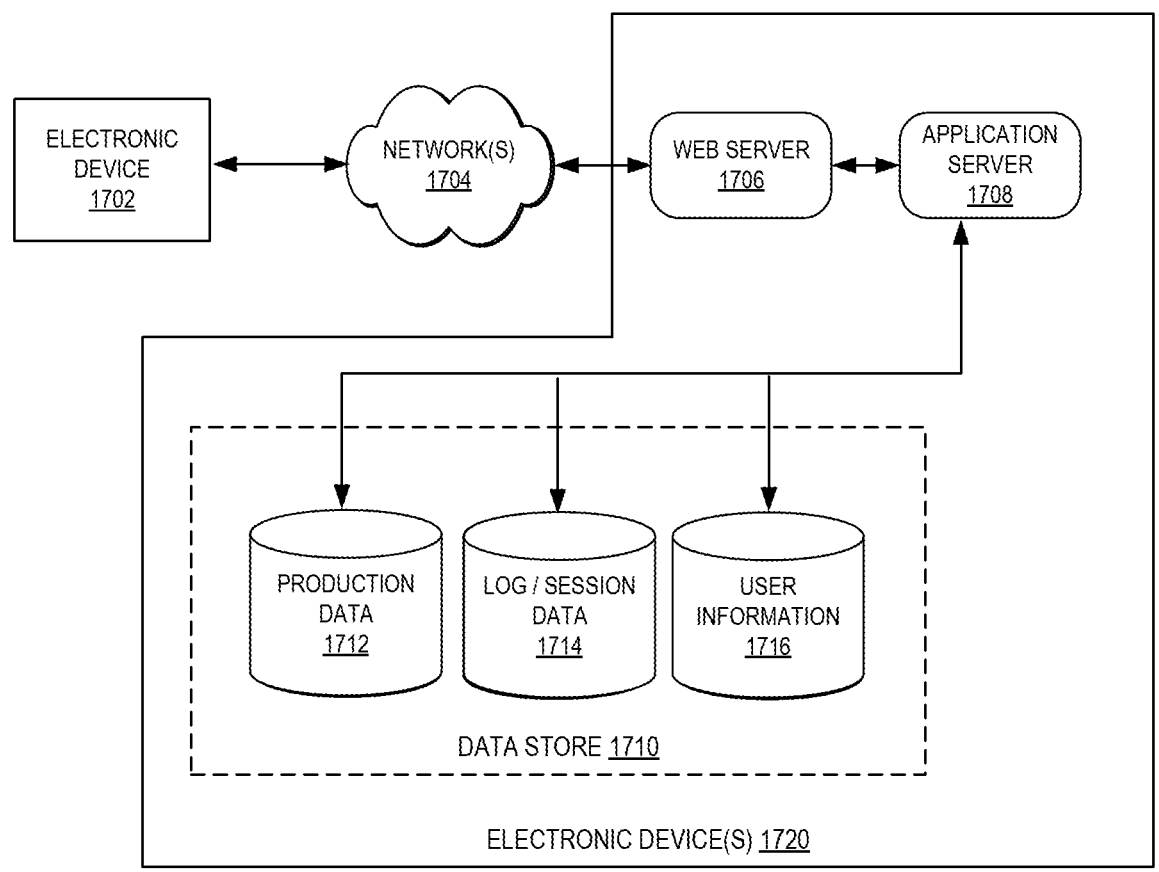
FIG. 17 illustrates an example of an environment for implementing aspects in accordance with various embodiments.

As discussed, different approaches can be implemented in various environments in accordance with the described embodiments. For example, FIG. 17 illustrates an example of an environment 1700 for implementing aspects in accordance with various embodiments. For example, in some embodiments requests are HyperText Transfer Protocol (HTTP) requests that are received by a web server (e.g., web server 1706), and the users, via electronic devices, may interact with the provider network via a web portal provided via the web server 1706 and application server 1708. As will be appreciated, although a web-based environment is used for purposes of explanation, different environments may be used, as appropriate, to implement various embodiments. The system includes an electronic client device 1702, which may also be referred to as a client device and can be any appropriate device operable to send and receive requests, messages or information over an appropriate network 1704 and convey information back to a user of the device 1702. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1704 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1704 includes the Internet, as the environment includes a web server 1706 for receiving requests and serving content in response thereto, although for other networks an alternative device serving a similar purpose could be used, as would be apparent to one of ordinary skill in the art.

The illustrative environment includes at least one application server 1708 and a data store 1710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1708 can include any appropriate hardware and software for integrating with the data store 1710 as needed to execute aspects of one or more applications for the client device 1702 and handling a majority of the data access and business logic for an application. The application server 1708 provides access control services in cooperation with the data store 1710 and is able to generate content such as text, graphics, audio, video, etc., to be transferred to the client device 1702, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1702 and the application server 1708, can be handled by the web server 1706. It should be understood that the web server 1706 and application server 1708 are not required and are merely example components, as structured code discussed herein can be executed on any appropriate device or host machine as discussed elsewhere herein.

The data store 1710 can include several separate data tables, databases, or other data storage mechanisms and media for storing data relating to a particular aspect. For example, the data store illustrated includes mechanisms for storing production data 1712 and user information 1716, which can be used to serve content for the production side. The data store 1710 also is shown to include a mechanism for storing log or session data 1714. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update, or otherwise process data in response thereto. In one example, a user might submit a search request for a certain type of item. In this case, the data store 1710 might access the user information 1716 to verify the identity of the user and can access a production data 1712 to obtain information about items of that type. The information can then be returned to the user, such as in a listing of results on a web page that the user is able to view via a browser on the user device 1702. Information for a particular item of interest can be viewed in a dedicated page or window of the browser.

The web server 1706, application server 1708, and/or data store 1710 may be implemented by one or more electronic devices 1720, which can also be referred to as electronic server devices or server end stations, and may or may not be located in different geographic locations. Each of the one or more electronic devices 1720 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the environment 1700 in FIG. 17 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
  receiving a request to display an interface including an item that has an associated image;
  requesting for, and receiving, a determination one or more similarity scores between the item and items of a same or similar category as the item, the one or more similarity scores based upon one or more Gram matrix-based style values and one or more vector distance calculation-based content values as determined from one or more outputs of layers of a convolutional neural network; and
  displaying one or more images of items that are similar to the image based on the one or more similarity scores.

2. The computer-implemented method of claim 1, wherein the convolutional neural network is a pre-trained image feature extraction model.

3. The computer-implemented method of claim 1, wherein which layers of the convolutional neural network to use for the Gram matrix-based and vector distance calculation-based content values are configurable.

4. A computer-implemented method comprising:
  receiving a request to determine similarity between a first image and at least one other image;
  determining similarity between the first image and at least one other image based upon one or more Gram matrix-based style values and one or more vector distance calculation-based content values as determined from one or more outputs of layers of a convolutional neural network; and
  providing an indication of the similarity between the first image and the at least one other image.

5. The computer-implemented method of claim 4, wherein the convolutional neural network is a pre-trained image feature extraction model.

6. The computer-implemented method of claim 5, wherein the vector distance calculation is one of L1 or L2 distance.

7. The computer-implemented method of claim 4, wherein which layers of the convolutional neural network to use for the Gram matrix-based and vector distance calculation-based content values are configurable.

8. The computer-implemented method of claim 4, wherein the indication is a similarity value generated by determining a difference of blended one Gram matrix-based style values and one or more vector distance calculation-based content values of the first image and blended one Gram matrix-based style values and one or more vector distance calculation-based content values of the at least one other image.

9. The computer-implemented method of claim 4, wherein the similarity between the first image and at least one other image is determined by an indexed database query to find images having similar Gram-based style values and vector distance calculation-based content values as the first image.

10. The computer-implemented method of claim 9, wherein the indication is one or more locations of images that have similar Gram-based style values and vector distance calculation-based content values.

11. The computer-implemented method of claim 4, wherein the similarity between the first image and at least one other image is determined by a nearest neighbor search against an index to find images having similar Gram-based style values and vector distance calculation-based content values as the first image.

12. The computer-implemented method of claim 4, wherein the indication is one or more locations of images that have similar Gram-based style values and L2-based content values.

13. The computer-implemented method of claim 4, wherein the convolutional neural network has been configured using a configuration having on or more of: content extraction layers identification and respective layer weightings, style extraction layers identification and respective layer weightings, a ratio of content versus style influence, and image storage information.

14. The computer-implemented method of claim 4, further comprising:
receiving an input to change a configuration of which layers of the convolutional neural network are to be used to determine similarity between the first image and at least one other image.

15. A system comprising:
a web application implemented by a first one or more electronic devices; and
a neural style inference service implemented by a second one or more electronic devices, the neural style inference service including instructions that upon execution cause the neural style inference service to: receive a request from the web application to determine similarity between a first image and at least one other image;
determine similarity between the first image and at least one other image based upon one or more Gram matrix-based style values and one or more vector distance calculation-based content values as determined from one or more outputs of layers of a convolutional neural network; and
provide an indication of the similarity between the first image and the at least one other image.

16. The system of claim 15, wherein the convolutional neural network is a pre-trained image feature extraction.

17. The system of claim 15, wherein the vector distance calculation is one of L1 or L2 distance.

18. The system of claim 15, wherein which layers of the convolutional neural network to use for the Gram matrix-based and vector distance calculation-based content values are configurable.

19. The system of claim 15, wherein the similarity between the first image and at least one other image is determined by a nearest neighbor search against an index to find images having similar Gram-based style values and vector distance calculation-based content values as the first image.

20. The system of claim 15, wherein the convolutional neural network has been configured using a configuration having on or more of: content extraction layers identification and respective layer weightings, style extraction layers identification and respective layer weightings, a ratio of content versus style influence, and image storage information.

* * * * *